INVENTORS
Robert N. Secord
and Charles A. Stokes
by [signature]

3,007,774
PRODUCTION OF FINELY-DIVIDED ALUMINUM OXIDE FROM BAUXITE
Charles A. Stokes, Wellesley Hills, and Robert N. Secord, North Reading, Mass., assignors to Cabot Corporation, Boston, Mass., a corporation of Delaware
Filed Apr. 14, 1955, Ser. No. 501,372
1 Claim. (Cl. 23—143)

This invention relates to an integrated process for producing finely-divided aluminum oxide of pigment grade from bauxite.

Bauxite is a native aluminum hydroxide forming a white, grayish or reddish clay-like mineral usually containing a substantial proportion of iron and other non-aluminum impurities. While the iron content can readily be removed by known techniques, the aluminum oxide constituent of the bauxite, because of its physical state and its intimate association with siliceous impurities, can not be readily converted to pure oxide, particularly of pigment grade, i.e., to an average particle size of below about 100 millimicrons.

It is the principal object of this invention to provide a novel process for producing pigment grade aluminum oxide from bauxite of any degree of impurity.

It is another object of this invention to provide such a process particularly adapted to effective use of highly siliceous bauxite as the raw material.

It is a further object of this invention to provide such a process in which the alumina value of bauxite is first converted to aluminum sulfate which in turn is decomposed in the fluid state to solid aluminum oxide and gaseous oxides of sulfur in aerosol form and then, after separation of the solid and gaseous constituents, the sulfur oxides are employed in the conversion of additional bauxite to aluminum sulfate.

Figure 1:
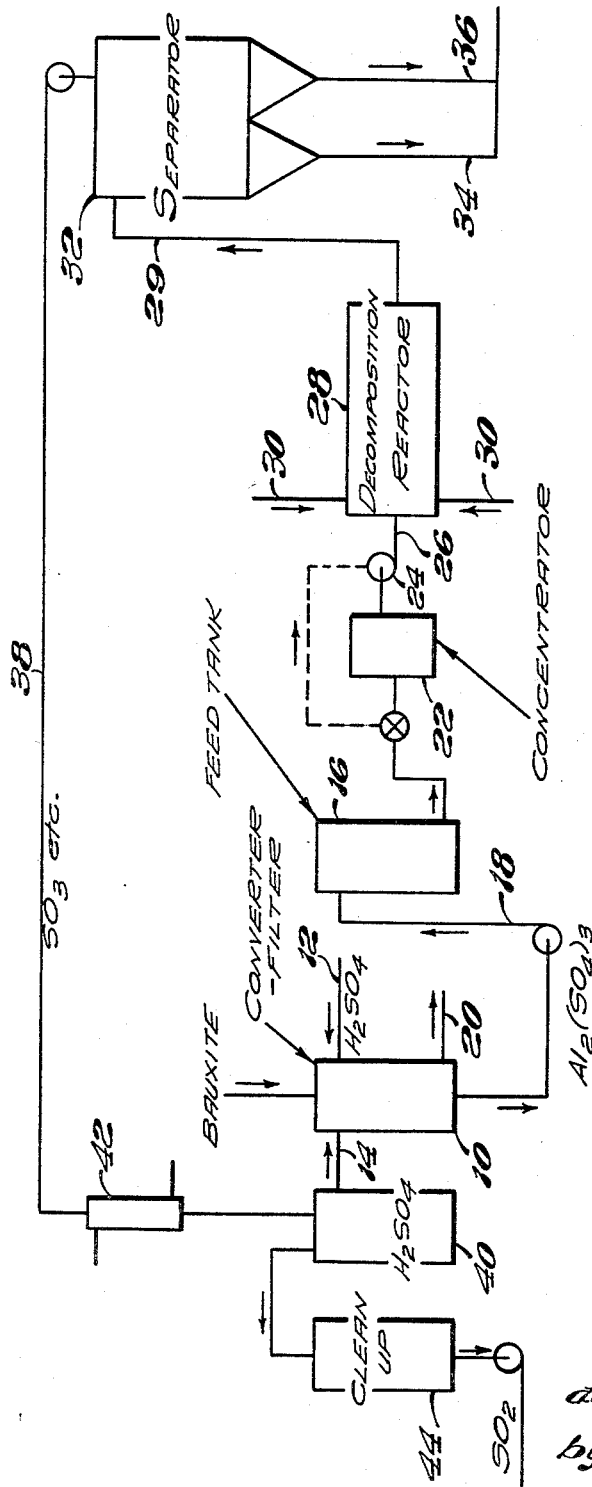
Figure 2:
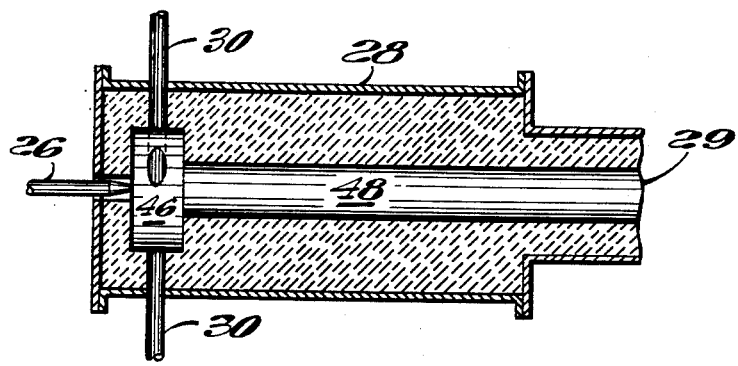
Figure 3:
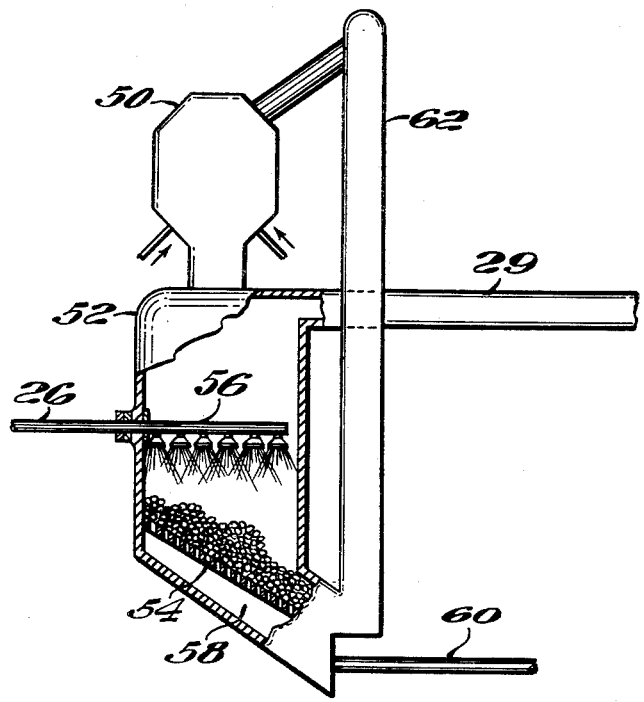

The process of this invention will best be understood and appreciated from the following description thereof taken in connection with the accompanying drawings in which FIG. 1 is a flow diagram of the process, FIG. 2 is a sectional view in side elevation of one embodiment of aluminum oxide reactor, and FIG. 3 is a diagrammatic view in side elevation of another type of reactor.

Referring first to the flow diagram of FIG. 1 bauxite, preferably from which most of its original iron content, if any, has previously been removed, is continuously fed to a converter-filter 10 to which sulfuric acid is supplied in required quantities through pipes 12 and 14. The alumina and metallic impurities content of the bauxite is reacted with the sulfuric acid in converter-filter 10 to aluminum sulfate melt which is conveyed therefrom to feed tank 16 through conduit 18. The residual siliceous matter retained on the filter screen in converter 10 is drawn off through pipe 20 and discarded. A concentrator 22 for the aluminum sulfate solution is preferably provided in conduit 18 although it is not essential to the process.

In feed tank 16 which is maintained at super-atmospheric pressure, the aluminum sulfate hydrated with at least 18 mols of water is maintained at a temperature not below that at which it becomes completely molten and is then propelled by pump 24 through feed pipe 26 into reactor 28. This reactor is a heat insulated chamber heated as by hot gases, to a sufficiently elevated temperature, i.e. at least about 1450° F., to decompose the aluminum sulfate. The hot gases will advantageously be provided by burning a combustible gas in an oxygen-containing gas delivered to the reactor through pipes 30 under conditions of turbulence. The gas-borne reaction products are then conducted from reactor 28 through cooling flue 29 to a separator 32 of convenient type, such as a plurality of cyclone separators in series, where the solid aluminum oxide is recovered from the gaseous decomposition products and drawn off through pipes 34 and 36.

The gaseous reaction products consist principally of oxides of sulfur and water vapor. These are conducted through pipe 38 to tank 40 in which water vapor condensed from the gases cooled in condenser 42 and fresh water are reacted with the available $SO_3$ to produce sulfuric acid. The gaseous products from the sulfuric acid recovery step are sent to appropriate cleanup apparatus 44 and the sulfuric acid is delivered to the bauxite converter 10 through pipe 14. Additional sulfuric acid as needed is supplied through pipe 12 as previously stated.

An additional feature of this invention is the step by which the molten aluminum sulfate is decomposed. One type of reactor 28 in which this step may be carried out is shown in FIG. 2. This reactor comprises a short combustion chamber 46 and a long reaction chamber 48 of diameter substantially less than that of combustion chamber 46. Pipes 30 enter the combustion chamber in a direction tangent to its inner wall so that the gases introduced therethrough have a spin imparted to them to provide a turbulent mass of hot gases. The molten aluminum sulfate is injected through pipe 26 axially into chamber 46 and is rapidly intermixed with the hot gases.

While any compatible hot gases, even including highly superheated steam, may be employed as decomposition heat carriers, the preferred procedure is to introduce a completely combustible mixture of a combustible gas and air or oxygen through pipes 30 and cause them to burn within the combustion chamber 46. The energy released by combustion added to that furnished by the velocity of inflow creates a high degree of turbulence. The speed of the aluminum sulfate decomposition reaction is directly proportionate to the amount of available heat and to the rate of heat transfer to the sulfate. By the same token the fineness of product particle size is to some extent dependent upon the speed of reaction. Hence it will be appreciated that this novel step of the invention provides for the production of a particularly finely-divided material.

While we have said that highly superheated steam may be employed in the decomposition step of the process of this invention its use will not ordinarily be preferred. Since the water of hydration must first be removed from the aluminum sulfate before it can be decomposed the amount of additional water added to the system should be kept to a minimum.

In FIG. 3 there is illustrated another novel reactor in which to decompose the molten aluminum sulfate. This comprises a pebble heater 50 of conventional design in which refractory pebbles are heated and delivered to decomposition reactor 52 having a perforate sloping floor 54. A spray 56 is provided in this chamber for delivering molten aluminum sulfate to the bed of hot pebbles and a compatible gas, supplied to antechamber 58 through pipe 60 is flowed upwardly through the perforations in floor 54 and through the bed of pebbles and material deposited thereon. The reaction products are carried out of the decomposition chamber 54 in the upflowing gas into flue 29 in aerosol form. The pebbles are recycled by means of elevator 62 to the heater. The reaction products are conducted to separator 32 through cooling flue 29 as previously described.

When carrying out the decomposition reaction in the apparatus just described it is advantageous to employ spherical pebbles of substantially uniform size in the range of one-half to two inches in diameter. Pebbles in this size range provide the maximum amount of free space for ready escape of the fluffy solid reaction product. The pebbles are heated to as high a temperature as possible, e.g. circa 1100° C., and flow in a continuous stream from heater to decomposition chamber. In fact, constant movement of pebbles in the decomposition chamber is essential to break up the cake which inevitably forms during dehydration and decomposition of the sulfate.

Whatever the type of decomposition reactor 28 employed the other steps of the process remain the same. The only difference as between reactors used lies in the metal oxide product obtained. The product from the reactor of FIG. 2 will tend to have a somewhat smaller particle size and greater surface area than that produced in the reactor of FIG. 3. However, this latter reactor has certain other advantages, notably in that the volume of diluent gases employed is usually lower than for the reactor of FIG. 2, hence recovery of $SO_3$ is easier. Also it can be operated over a wider temperature and dilution gas range than can the other.

The following example is illustrative of the process of this invention.

*Example*

A crude bauxite which, as mined in South Central Georgia, is high in siliceous impurity but relatively low in iron is subjected, in finely divided form, to a combined magnetic and flotation treatment for removal of iron. In this way the iron content is reduced from the original value of somewhat above 2% to less than 0.5% by weight of the ore. The resultant ground bauxite which now analyzes 28% $H_2O$, 12% $SiO_2$, 58% $Al_2O_3$ and only about 2% other metal oxides (chiefly titania) is then digested in a mixing tank with about 285 parts of recycle sulfuric acid (47% $H_2SO_4$) and about 44 parts make-up sulfuric acid (78% $H_2SO_4$) per 100 parts of said ore. While the entire mixture is thoroughly agitated, the reaction proceeds with the formation of aluminum sulfate. The temperature of the mixture increases gradually as the reaction proceeds due to its exothermic nature so that very little external heat is necessary to produce a concentrated melt of aluminum sulfate at its incipient boiling point— approximately 225° F. The insoluble siliceous residue which remains is allowed to settle and is removed as slude after taking the hot melt of aluminum sulfate in the upper clarified layer through a heater filter. The purified hot melt, which now has a concentration of a little over 50% $Al_2(SO_4)_3$, corresponding approximately to the composition of the hydrated salt, $(Al_2(SO_4)_3.18H_2O)$, is conducted while maintaining its temperature, to a heated feed tank. This feed tank is pressurized and the contents are heated to about 250° F. or slightly higher. The hot melt is then fed through a fine strainer to a reactor such as that illustrated in FIGURE 2. The strained solution is injected at a pressure of about 50 p.s.i.g. into said reactor in a generally axial direction through a 30° full cone pressure-atomizing nozzle at a metered rate of about 0.1 gallon/minute surrounded by an air blanket which enters around said nozzle. The temperature inside the reactor is maintained between 1500–1600° F. by two tangentially fired natural gas burners operating on a total of about 3 c.f.m. natural gas and 30 c.f.m. of air. This is about a stoichiometric mixture which together with the blanket air around the nozzle and the extra oxygen from sulfate decomposition provides the slightly oxidizing combustion conditions which are desirable in order to avoid the formation of carbon which would otherwise contaminate the $Al_2O_3$ product. The reactor provides a total residence time of less than 1 second so that the decomposition of the $Al_2(SO_4)_3$ occurs almost instantly. The exhaust gases bearing the very finely-divided $Al_2O_3$, which is thus produced in aerosol form, are conducted through a coil for cooling and agglomeration of the solid oxide. Finally, the solid oxide is recovered by passing the partially cooled exhaust gases (about 800° F.) through ceramic tube filter. The exhaust gases stripped of the oxide product are then passed through a condenser wherein they are cooled to about 200° F. or below and finally they are bubbled through a cooled tank of water for absorption of remaining $SO_3$ and the $H_2SO_4$ mist formed in the condenser. In this way, much of the $H_2SO_4$ originally required for reaction with bauxite is recovered for reuse in treating more bauxite. Even higher recovery can be obtained by also recovering $SO_2$, a refinement which is feasible on a large scale.

The $Al_2O_3$ recovered in the above process is a finely-divided fluffy off-white powder having a high surface area (upwards of 50 sq. meters/gram as determined by $N_2$ adsorption measurements). If an absolutely white pigment is desired, substantially all of the iron remaining in the bauxite reacted in the above example is removed from the process by treating the hot melt of aluminum sulfate formed in the sulfuric acid digester with about 20 std. cu. ft. $H_2S$ per 100 lbs. of original bauxite ore. In this way, iron and titanium sulfides are precipitated and removed with the siliceous impurities.

It will be appreciated that the nature of the final aluminum oxide product, notably its color, will to some extent depend upon the nature of the bauxite raw material delivered to the process. If the bauxite is substantially iron free the oxide will be almost pure white; if iron is present the oxide will be a light tan the shade of which will be determined by the amount of iron oxide present.

As we have said, it may be desired to remove the metallic impurities from the system prior to conversion of the aluminum sulfate to oxide. This may be effected by treating the sulfate melt in converter-filter 10 with a sulfide such as hydrogen, ammonium or barium sulfide. By this treatment small proportions of other sulfides such as that of titanium will be precipitated and separated from the process along with the siliceous sludge.

When the economics of the process dictate an additional step may be included whereby to utilize the $SO_2$ discharged from cleanup tank 44. For example, $SO_2$ may be regenerated to $SO_3$ and recycled to make up of sulfuric acid.

Having thus described our invention, we claim:

A continuous process for the production of finely-divided aluminum oxide from bauxite which comprises digesting bauxite with sulfuric acid, thereby forming molten hydrated aluminum sulfate, decomposing said aluminum sulfate to aluminum oxide and the gaseous oxides of sulfur by spraying the said molten hydrated aluminum sulfate onto a downwardly moving bed of hot pebbles through which simultaneously a stream of gas is flowed upwardly to remove said aluminum oxide and gaseous oxides of sulfur, separating said aluminum oxide from said oxides of sulfur, converting the convertible constituents of said oxides of sulfur to sulfuric acid, and reacting said sulfuric acid with additional bauxite.

References Cited in the file of this patent

UNITED STATES PATENTS

| | | |
|---|---|---|
| 2,263,766 | Fentress et al. | Nov. 25, 1941 |
| 2,381,477 | Walthall | Aug. 7, 1945 |
| 2,616,795 | Krejci | Nov. 4, 1952 |
| 2,659,663 | Heller | Nov. 17, 1953 |
| 2,699,986 | Buell et al. | Jan. 18, 1955 |
| 2,729,570 | Nichol | Jan. 3, 1956 |
| 2,801,901 | Dingman et al. | Aug. 6, 1957 |
| 2,828,186 | Dingman et al. | Mar. 25, 1958 |

FOREIGN PATENTS

| | | |
|---|---|---|
| 661,685 | Great Britain | Nov. 28, 1951 |
| 1,092,671 | France | Nov. 10, 1954 |

OTHER REFERENCES

Lange, N.A.: Handbook of Chemistry, 9th Ed., Handbook Publishers, Inc., Sandusky, Ohio, 1956, pages 214, 215.

Ser. No. 379,872, Ebner (A.P.C.), published April 27, 1943.